US012701399B2

(12) United States Patent
Kanchiraju et al.

(10) Patent No.: US 12,701,399 B2
(45) Date of Patent: Aug. 4, 2026

(54) DUAL SUBSCRIBER IDENTITY MODULE (SIM) CONFIGURATION

(71) Applicant: Boost SubscriberCo L.L.C., Englewood, CO (US)

(72) Inventors: Kantha Kumar Kanchiraju, Overland Park, KS (US); Robert Urbanek, Overland Park, KS (US)

(73) Assignee: Boost SubscriberCo L.L.C., Englewood, CO (US)

( * ) Notice: Subject to any disclaimer, the term of this patent is extended or adjusted under 35 U.S.C. 154(b) by 403 days.

(21) Appl. No.: 18/206,385

(22) Filed: Jun. 6, 2023

(65) Prior Publication Data

US 2023/0396980 A1     Dec. 7, 2023

Related U.S. Application Data

(60) Provisional application No. 63/349,479, filed on Jun. 6, 2022.

(51) Int. Cl.
*H04W 4/60*       (2018.01)
*H04W 8/18*       (2009.01)

(52) U.S. Cl.
CPC ........... *H04W 8/183* (2013.01); *H04W 8/186* (2013.01)

(58) Field of Classification Search
None
See application file for complete search history.

(56) References Cited

U.S. PATENT DOCUMENTS

2017/0289788 A1* 10/2017 Lalwaney ............... H04W 8/24

* cited by examiner

*Primary Examiner* — Gary Lafontant
(74) *Attorney, Agent, or Firm* — Lowenstein Sandler LLP

(57) ABSTRACT

Methods, systems, and apparatus, including computer programs encoded on computer storage media, for enabling a dual SIM configuration. One of the methods includes obtaining, at a mobile device, a first network subscription corresponding to a first subscriber identity module (SIM), and determining that the mobile device supports a second network subscription corresponding to a second SIM capable of communicating with radio access network (RAN) resources of a wireless service provider. The method includes obtaining the second network subscription for the second SIM in response to determining that the mobile device supports the two network subscriptions. The method includes configuring the second SIM in accordance with the second network subscription such that data packets to and from the mobile device are routed through the second SIM over the RAN resources of the wireless service provider, and routing data packets to and from the mobile device through the second SIM using the second network subscription.

17 Claims, 7 Drawing Sheets

Enviroment 100

Enviroment 100

300

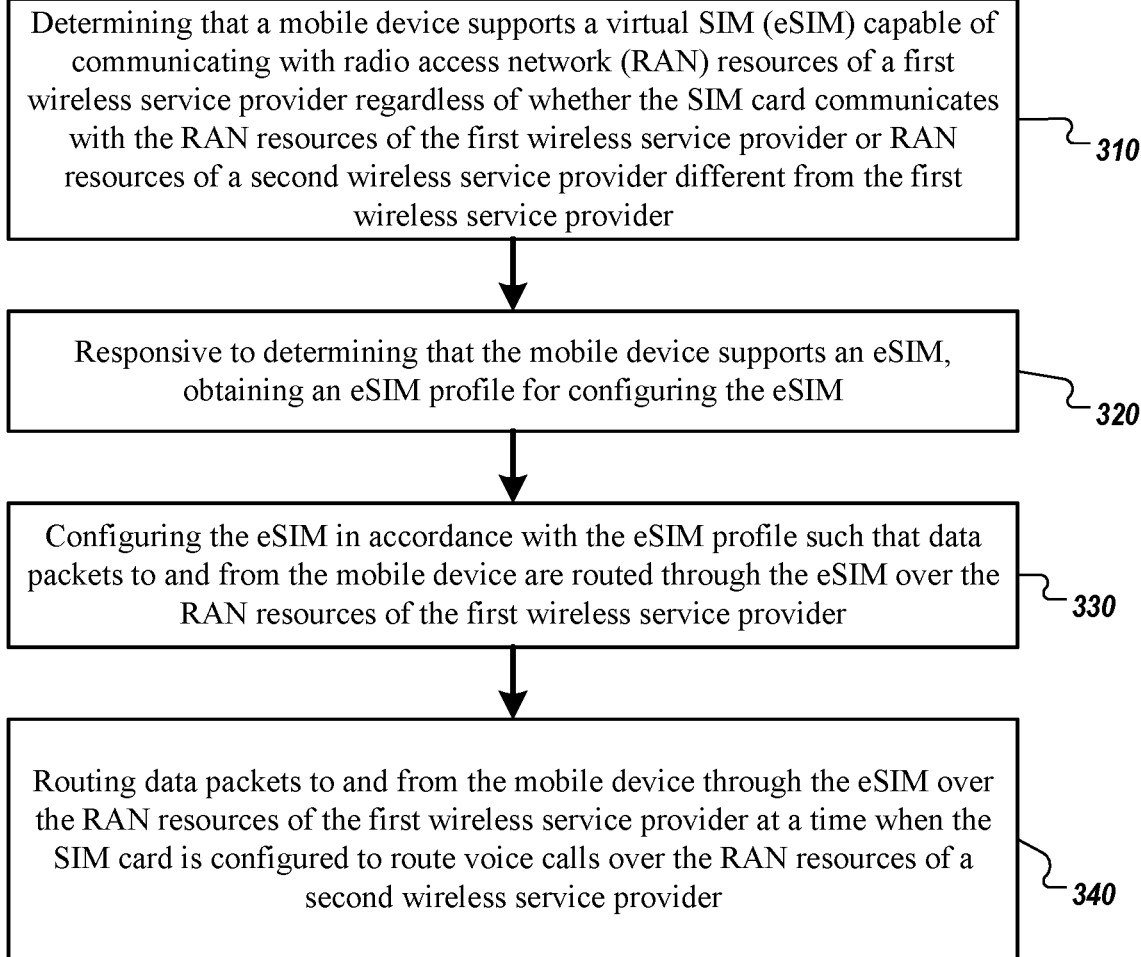

Determining that a mobile device supports a virtual SIM (eSIM) capable of communicating with radio access network (RAN) resources of a first wireless service provider regardless of whether the SIM card communicates with the RAN resources of the first wireless service provider or RAN resources of a second wireless service provider different from the first wireless service provider ⟩ 310

Responsive to determining that the mobile device supports an eSIM, obtaining an eSIM profile for configuring the eSIM ⟩ 320

Configuring the eSIM in accordance with the eSIM profile such that data packets to and from the mobile device are routed through the eSIM over the RAN resources of the first wireless service provider ⟩ 330

Routing data packets to and from the mobile device through the eSIM over the RAN resources of the first wireless service provider at a time when the SIM card is configured to route voice calls over the RAN resources of a second wireless service provider ⟩ 340

FIG. 3

DUAL SUBSCRIBER IDENTITY MODULE (SIM) CONFIGURATION

CROSS-REFERENCE TO RELATED APPLICATION

This application claims priority to U.S. Patent Application No. 63/349,479, filed on Jun. 6, 2022, the entirety of which is hereby incorporated by reference.

BACKGROUND

A subscriber identity module (SIM) allows a user equipment device (UE) to be identified and authenticated on a network. The UE is identified by the international mobile subscriber identity (IMSI) number associated with the SIM. The SIM identifies which service provider's network the UE connects with. Network service providers may provide customers with a device with a preinstalled SIM for their network, or users may insert a SIM for the network into their own device. The SIM may also be associated with a phone number for the device. A SIM may be a physical SIM (PSIM) or an embedded SIM (eSIM). A PSIM is a physical card that is inserted into a slot in the UE. An eSIM is a profile that can be downloaded to a mobile device to provide functionalities of a SIM.

SUMMARY

In general, one aspect of the present disclosure can be embodied in methods that include obtaining, at a mobile device, a first network subscription corresponding to a first subscriber identity module (SIM). The methods include determining, at the mobile device, that the mobile device supports the first network subscription and at least a second network subscription corresponding to at least a second SIM capable of communicating with radio access network (RAN) resources of a first wireless service provider regardless of whether the first network subscription corresponds to the first wireless service provider or a second wireless service provider different from the first wireless service provider, and responsive to determining that the mobile device supports the first network subscription and the at least second network subscription, obtaining the at least second network subscription for the at least second SIM. The methods include configuring, using one or more processors of the mobile device, the at least second SIM in accordance with the at least second network subscription such that data packets to and from the mobile device are routed through the at least second SIM over the RAN resources of the first wireless service provider, and routing data packets to and from the mobile device through the at least second SIM using the at least second network subscription at a time when the first SIM is configured to route voice calls using the first network subscription.

One aspect of the present disclosure can be embodied in a mobile device. The mobile device can include one or more processors and one or more non-transitory storage devices that can store instructions operable, when executed by the one or more processors, to cause the one or more processors to perform operations including obtaining a first network subscription corresponding to a first subscriber identity module (SIM). The operations can include determining that the mobile device supports the first network subscription and at least a second network subscription corresponding to at least a second SIM capable of communicating with radio access network (RAN) resources of a first wireless service provider regardless of whether the first network subscription corresponds to the first wireless service provider or a second wireless service provider different from the first wireless service provider, and responsive to determining that the mobile device supports the first network subscription and the at least second network subscription, obtaining the at least second network subscription for the at least second SIM. The operations can include configuring the at least second SIM in accordance with the at least second network subscription such that data packets to and from the mobile device are routed through the at least second SIM over the RAN resources of the first wireless service provider, and routing data packets to and from the mobile device through the at least second SIM using the at least second network subscription at a time when the first SIM is configured to route voice calls using the first network subscription.

One aspect of the present disclosure can be embodied in a non-transitory computer storage medium of a mobile device encoded with instructions that, when executed by one or more processors of the mobile device, cause the one or more processors of the mobile device to perform operations including obtaining a first network subscription corresponding to a first subscriber identity module (SIM). The operations can include determining that the mobile device supports the first network subscription and at least a second network subscription corresponding to at least a second SIM capable of communicating with radio access network (RAN) resources of a first wireless service provider regardless of whether the first network subscription corresponds to the first wireless service provider or a second wireless service provider different from the first wireless service provider, and responsive to determining that the mobile device supports the first network subscription and the at least second network subscription, obtaining the at least second network subscription for the at least second SIM. The operations can include configuring the at least second SIM in accordance with the at least second network subscription such that data packets to and from the mobile device are routed through the at least second SIM over the RAN resources of the first wireless service provider, and routing data packets to and from the mobile device through the at least second SIM using the at least second network subscription at a time when the first SIM is configured to route voice calls using the first network subscription.

Each of the above aspects can include one or more of the following features.

In some embodiments, determining that the mobile device supports the first network subscription and the at least second network subscription includes detecting whether the mobile device comprises an embedded Universal Integrated Circuit Card (EUICC).

In some embodiments, configuring the at least second SIM in accordance with the at least second network subscription includes launching an application on the mobile device, initiating a communication between the application and an application programming interface (API) associated with the EUICC, receiving an eSIM profile from a remote server, and storing the eSIM profile on the EUICC via the API.

In some embodiments, configuring the at least second SIM in accordance with the at least second network subscription includes transmitting, by the mobile device to a remote server, an identifier associated with the mobile device, and receiving, in response to transmitting the identifier, an eSIM profile from the remote server.

In some embodiments, the identifier associated with the mobile device includes an embedded identifier (EID) of an EUICC.

In some embodiments, a mobile device determines a removal of the first SIM card from the mobile device, and in response, disables routing of data packets through the second SIM.

In some embodiments, a mobile device groups the first network subscription and the at least second network subscription into a single subscription group, and presents, on the mobile device, the single subscription group.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The subject matter described in this specification can be implemented in various embodiments and may result in one or more of the following advantages. Always routing data through the eSIM allows the technical advantage of requiring less processing and transmission than switching data between the eSIM and PSIM based on network coverage. Only presenting a single subscription to the user allows a simplified experience for the user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow diagram of an example process 300 for enabling a dual SIM configuration.

Like reference numbers and designations in the various drawings indicate like elements.

DETAILED DESCRIPTION

This document describes a dual SIM configuration for a mobile device wherein a physical SIM (PSIM) and virtual or electronic (eSIM) operate substantially concurrently. For example, data packets to and from the mobile device can be routed through the eSIM over the radio access network (RAN) resources of a first wireless service provider simultaneously when the SIM card (or PSIM) is configured to route voice calls over the RAN resources of a second wireless service provider.

General Overview

A computing system may be configured to transmit data communications through a first network subscription and transmit voice communications through a second network subscription. The first and second network subscriptions may correspond to the same network or different networks. As a result, a user equipment device (UE) may receive data through a first network and voice through a second network. The first network subscription may correspond to a first subscriber identity module (SIM), and the second network subscription may correspond to a second SIM. The first and second network subscriptions may be grouped into a single subscription, and the first subscription may be opportunistic, so that only a single subscription is visible to a user. This creates the benefit that a service provider can provide a combination of the best available networks while providing a simple-to-use experience to a user. The improved mobile experience will appear no more complex to the user than a traditional single network subscription.

Figure 1:
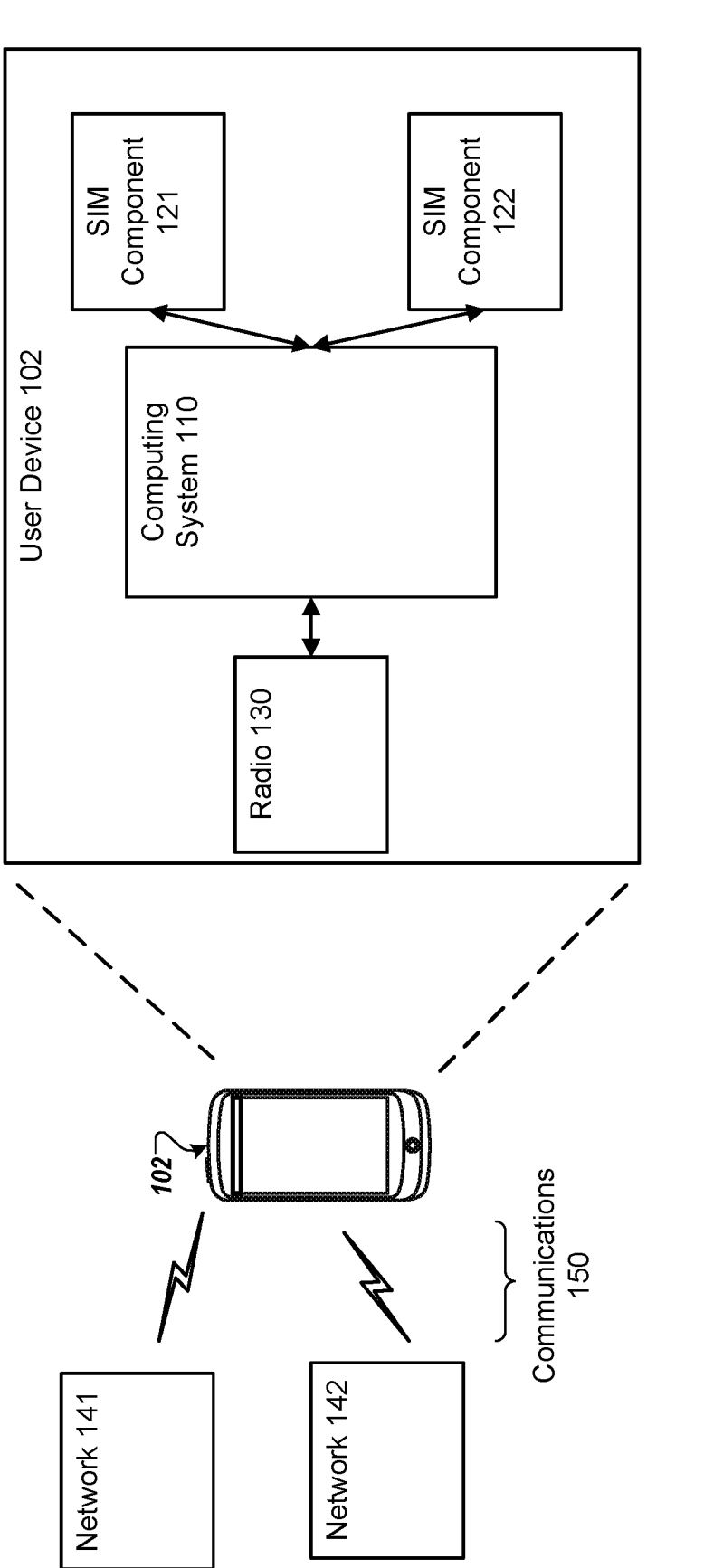
FIG. 1 is an example environment for Dual SIM networking.
Figure 2A:
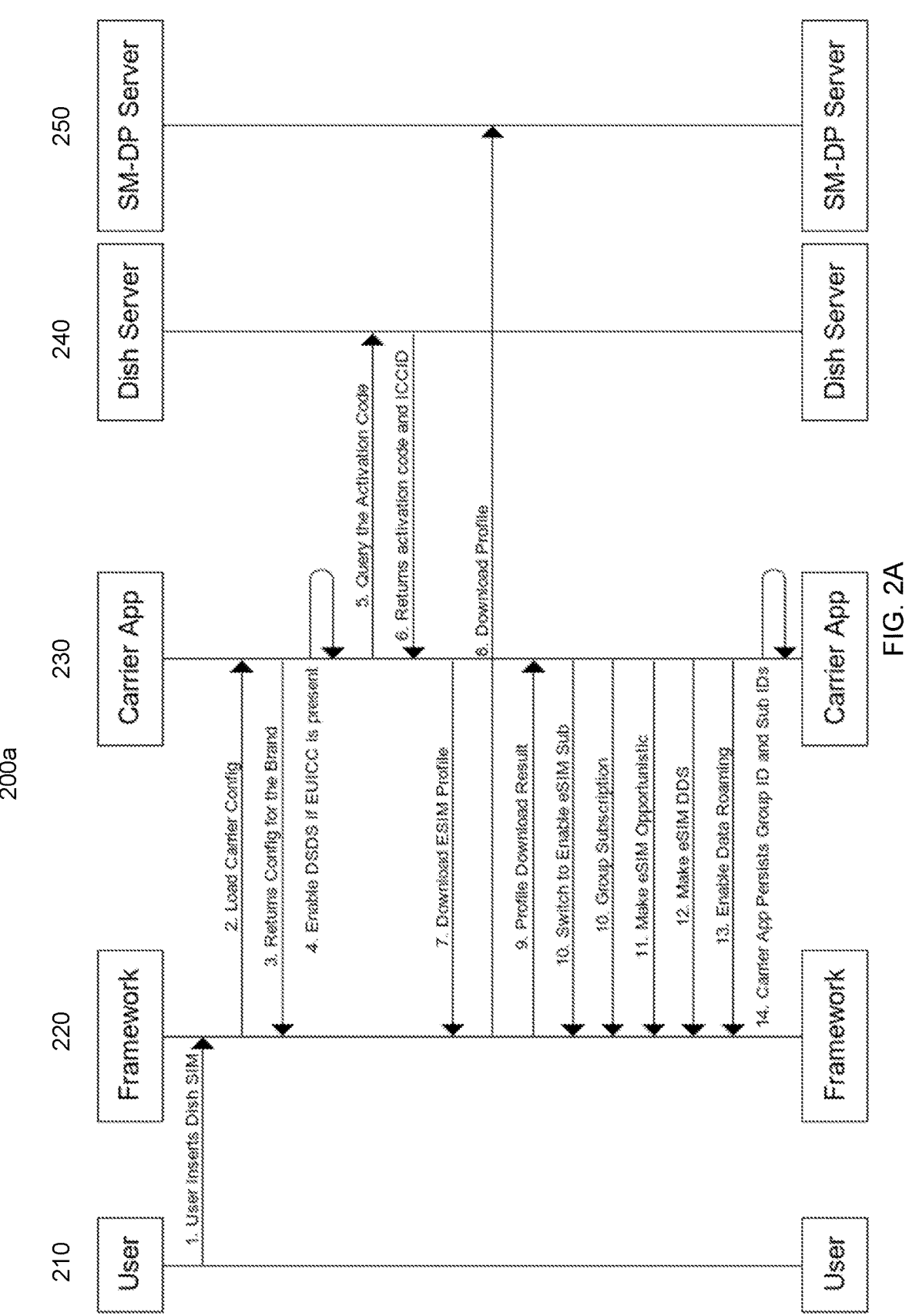
FIGS. 2A-2D are sequence diagrams of example processes for enabling a dual SIM configuration.
Figure 2B:
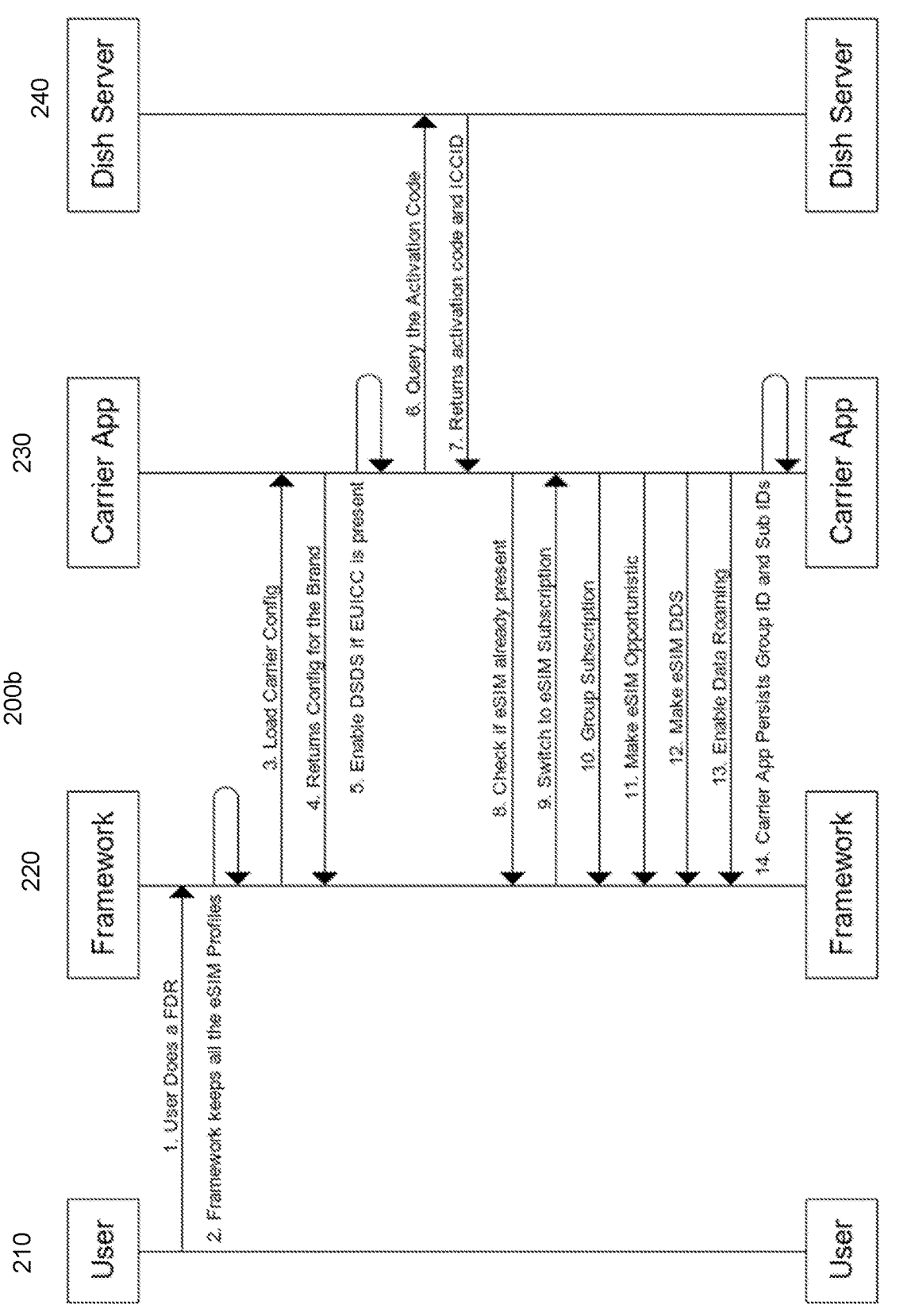
Figure 2C:
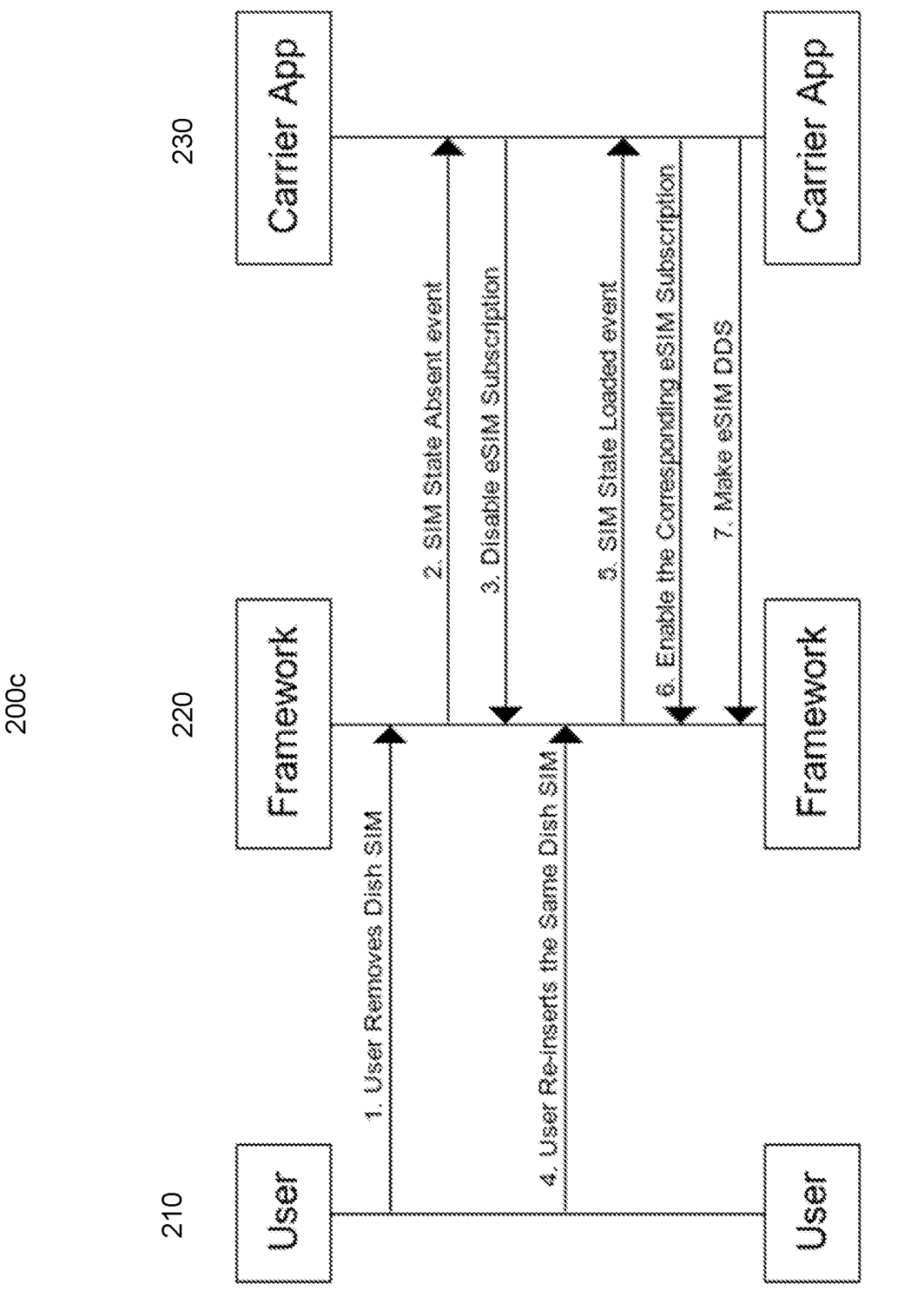
Figure 2D:
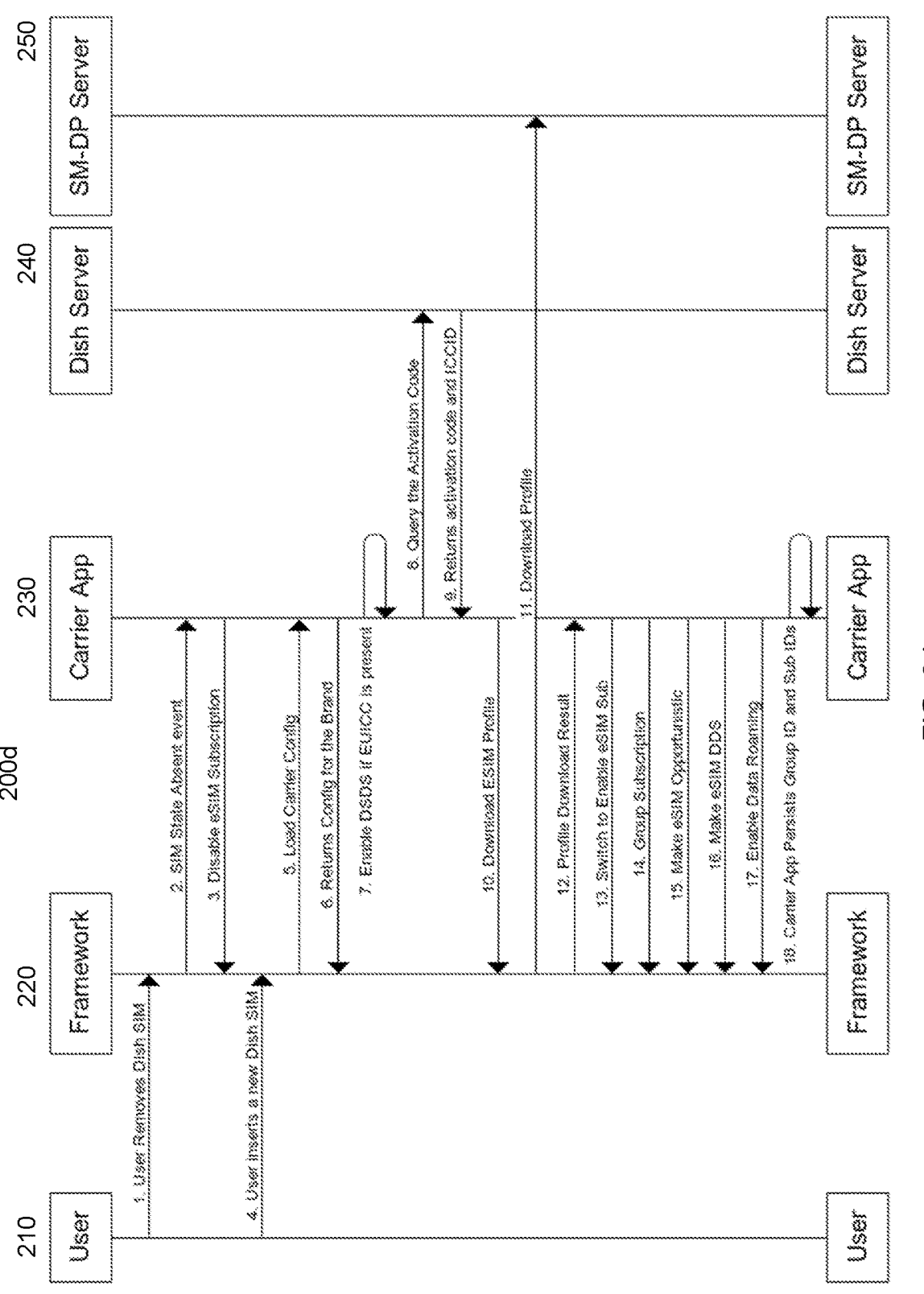

FIG. 1 is an example environment 100 for dual SIM networking. The environment 100 may include a user device 102, and networks 141 and 142. The user device 102 may be a mobile device (i.e., UE), and may send and receive data over the networks 141 and 142 through communications 150. The networks 141 and 142 may include a radio access network (RAN). The device 102 may connect with the networks 141 and 142 using the radio 130. The user device 102 may also send and receive data over other networks (not shown), such as a local area network ("LAN"), a wide area network ("WAN"), the Internet, or a combination thereof, which connect the user device 102 with other user devices and servers. The user device 102 may communicate with a single server computer or multiple server computers operating in conjunction with one another, including, for example, a set of remote computers deployed as a cloud computing service. The user device 102 may include computing system 110, the SIM component 121, the SIM component 122, and the radio 130.

The computing system 110 may be implemented as computer programs on one or more computers in one or more locations, in which the systems, components, and techniques described in this specification are implemented. The computing system 110 can include one or more data processing apparatuses, can be implemented in code, or a combination of both. For instance, each of the computing system 110 can include one or more data processors and instructions that cause the one or more data processors to perform the operations discussed herein. The computing system 110 of FIG. 1 may include the carrier app 230 of FIGS. 2A-2D, and may perform the steps described in connection with the carrier app 230.

The SIM component 121 may include a slot for a physical SIM (PSIM). A PSIM is a physical card that is inserted into a slot in the UE. The SIM component 122 is hardware that is separate from the SIM component 121 and the PSIM. The SIM component 122 may conform to the machine-to-machine form factor (MFF2), and may include an embedded universal integrated circuit card identifier (EUICC) which acts as hybrid hardware. An embedded SIM (eSIM) profile can be downloaded onto the SIM component 122. An eSIM may act as a software SIM, including assigning a phone number to the device. The EUICC allows over-the-air (OTA) provisioning of the eSIM profile.

The radio 130 may be used to send and receive communications between the SIM component 121 and the network 141, and between the SIM component 122 and the network 142. The SIM components 121 and 122 may take turns using the radio 130. For example, the SIM component 121 may access the network 141 whenever possible, and the SIM component 122 may have a higher priority and access the network 142 when a transmission is pending.

The computing system 110 may be configured to determine that the mobile device supports a virtual SIM (eSIM) capable of communicating with radio access network (RAN) resources of a first wireless service provider regardless of whether the SIM card communicates with the RAN resources of the first wireless service provider or the RAN resources of a second wireless service provider different from the first wireless service provider. This determination may occur at a mobile device (i.e., UE) that includes at least one SIM card. For example, the SIM card of the UE may be a PSIM. In some embodiments, determining that the mobile device supports an eSIM includes detecting whether the mobile device comprises an EUICC.

Responsive to determining that the mobile device supports an eSIM, the computing system 110 may obtain an eSIM profile for configuring the eSIM. In some embodiments, more than one eSIM profile may be obtained. Obtaining may include one or more of accessing, acquiring, analyzing, determining, examining, identifying, loading, locating, opening, receiving, retrieving, reviewing, storing, or otherwise obtaining information. Obtaining the eSIM profile may include launching an application on the mobile device. A communication between the application and an application programming interface (API) associated with the EUICC may be initiated, and the eSIM profile may be received from a remote server. An identifier associated with the mobile device may be transmitted by the mobile device to the remote server, and the eSIM profile may be received from the remote server in response to transmitting the identifier. The identifier associated with the SIM card may include an embedded identifier (EID) of the EUICC. For example, an application associated with the network carrier (i.e., service provider) may read the EID from the mobile device. The eSIM profile may then be stored on the EUICC via the API. For example, the eSIM profile may be downloaded from a server system associated with a carrier of the network service associated with the eSIM.

In some embodiments, the EID may be sent to a remote server (e.g., provisioning server) to prepare a profile of the eSIM. A link to the profile of the eSIM may be obtained from the remote server in response to sending the EID. In some embodiments, an activation code and ICCID may be received from the remote server. The profile of the eSIM may be obtained through the obtained link, and the eSIM may be loaded onto the EUICC. The eSIM may be tied to the device EID. In some embodiments, the eSIM can be downloaded only once to a device. In some embodiments, the eSIM will be deactivated when the corresponding PSIM is deactivated.

The computing system 110 may use one or more processors of the mobile device, to configure the eSIM in accordance with the eSIM profile such that data packets to and from the mobile device are routed through the eSIM over the RAN resources of the first wireless service provider. For example, the eSIM may go through an OTA session for provisioning. This may include provisioning the eSIM for data-only usage, and activating the subscription corresponding to the eSIM.

In some embodiments, a subscription corresponding to the eSIM may be enabled using the switchToSubscription( ) function of the Android SubscriptionManager application programming interface (API). This function switches to a given subscription. For example, for a newly obtained subscription profile, the function may result in the subscription being enabled.

The first subscription corresponding to the eSIM may be grouped with a second subscription corresponding to the PSIM to create a subscription group. In some embodiments, subscriptions (e.g., subscriptions corresponding to the eSIM and PSIM) may be grouped into a single subscription using the createSubscriptionGroup( ) function of the Android SubscriptionManager API. A group universally unique identifier (UUID) may be assigned to all of the subscriptions. The subscriptions in the group may be classified as primary (i.e., non-opportunistic) subscriptions or supplementary subscriptions (i.e., opportunistic). In some embodiments, a third subscription (e.g., corresponding to a third SIM) may be added to the subscription group.

The first subscription corresponding to the eSIM may be set as opportunistic so that the first subscription is invisible. In some embodiments, the eSIM subscription may be set as opportunistic using the setOpportunistic( ) function of the Android SubscriptionManager API. Setting a subscription as opportunistic may indicate that the corresponding network has limited coverage. An opportunistic subscription may remain dormant for a majority (i.e., greater than half) of the time in order to save power. For example, the subscription may remain dormant until the UE is in range of an available network.

The opportunistic subscriptions in a subscription group may be considered as invisible because they will not be returned from a call to obtain a list of active subscriptions (e.g., using getActiveSubscriptionInfoList( ), unless the caller has carrier privilege permissions for the subscriptions. This way, the eSIM is hidden from the user and there appears only one active service to the user. The end result of the two steps of grouping the SIMS and making the eSIM opportunistic is that the eSIM is hidden (i.e., invisible) from the user. Because the eSIM is invisible, only a single active service subscription will appear to the user. For example, an indicator of a single subscription corresponding to the subscription group may be displayed on the UE to the user. In some embodiments, the eSIM may be set as opportunistic before the first and second subscriptions are grouped.

The opportunistic first subscription corresponding to the eSIM may be set as a default data subscription (DDS). In some embodiments, the eSIM subscription may be set as the DDS using the setPreferredOpportunisticDataSubscription( ) function of the Android TelephonyManager API. Setting a subscription as the preferred opportunistic data subscription will switch Internet data to the designated subscription. The eSIM subscription may be set as the DDS on reboots, factory default resets (FDRs), and corresponding SIM events (e.g., reinserts, pop and swap). In some embodiments, the preferred data subscription is changed to the eSIM only once when the eSIM is provisioned.

Data communications may be received through the first subscription corresponding to the eSIM and serving as the DDS, and voice communications may be received through the second subscription corresponding to the PSIM. In some embodiments, the data communications and the voice communications may be received from a single network. In other embodiments, the data communications may be received from a first network, and the voice communications may be received from a second network.

The eSIM and PSIM may function in a Dual SIM Dual Standby (DSDS) configuration. The eSIM may try to access the corresponding network whenever possible. The PSIM may have a higher priority and access the corresponding network 142 when a transmission is pending. For example, the computing system 110 can access the PSIM through the DSDS to see if there is a call waiting. Control of the radio 130 may be given to the PSIM in response to receiving a call notification. The eSIM may be provisioned for only data communications and the PSIM may be used to handle voice communications.

In some embodiments, the data communications may be received through the eSIM on a second network in response to determining that a first network is unavailable. When the primary data coverage (e.g., a carrier's 5G) is not available, the UE will continue to use the eSIM and roam on a preferred backup network (e.g., based on region, cost, priority, etc.). The backup network may include a different network associated with the primary carrier (e.g., a 4G network) or a network associated with a partner carrier.

The computing system 110 may determine a removal of the SIM card from the mobile device. In response, routing of data packets through the eSIM may be disabled. When a SIM card is moved to a new UE, a new eSIM profile will be generated and released to the new UE. Data communications may then be received through a subscription associated with the new eSIM profile.

FIGS. 2A-2D are sequence diagrams of example processes 200a-200d for enabling a dual SIM configuration. For example, the processes 200a-200d can be used in connection with the user device 102 in the environment 100. The sequence diagrams include interactions between the user 210, the framework 220, the carrier app 230, the server 240, and Subscription Manager and Data Preparation (SM-DP) server 250. The user 210 may include an end user of the UE or an employee of the carrier. The framework 220 may include a combination of hardware or software associated with the user device 102 (e.g., an operating system). The carrier app 230 may correspond to the computing system 110.

Process 200a is an example sequence of steps for enabling DSDS between an eSIM and a newly inserted carrier SIM card. The user 210 inserts a carrier-specific SIM card into the UE. The carrier app 230 receives a request to load the carrier configuration from the framework 220, and returns the brand-specific configuration in response to the request. The carrier app 230 then enables DSDS if an EUICC is present. The carrier app 230 queries the server 240 for the activation code of the service, and receives the activation code and ICCID in response to the query. The carrier app 230 then downloads the eSIM profile onto the framework 220. The profile is then downloaded from the SM-DP server, and the carrier app 230 is notified of the download result. The carrier app 230 then uses a switch function to enable the eSIM subscription, groups the eSIM subscription with the PSIM subscription, sets the eSIM subscription as opportunistic, and makes the eSIM subscription the DDS. The carrier app 230 then enables data roaming to route through the eSIM. The carrier app 230 persists the group ID and subscription IDs of the eSIM subscription and the PSIM subscription.

Process 200b is an example sequence of steps for enabling DSDS after a factory default reset (FDR). The user 210 performs an FDR. The framework maintains all of the eSIM profiles. The carrier app 230 receives a request to load the carrier configuration from the framework 220 and returns the brand-specific configuration in response to the request. The carrier app 230 then enables DSDS if an EUICC is present. The carrier app 230 queries the server 240 for the activation code of the service and receives the activation code and ICCID in response to the query. The carrier app 230 then checks whether the eSIM profile is already present on the framework 220. The carrier app 230 then uses a switch function to enable the eSIM subscription, groups the eSIM subscription with the PSIM subscription, sets the eSIM subscription as opportunistic, and makes the eSIM subscription the DDS. The carrier app 230 then enables data roaming to route through the eSIM. The carrier app 230 persists the group ID and subscription IDs of the eSIM subscription and the PSIM subscription.

Process 200c is an example sequence of steps for enabling DSDS after a SIM card reinsert. The user 210 removes a carrier-specific SIM card from the UE. The carrier app 230 receives a SIM state absent event from the framework 220, and disables the eSIM subscription. The user 210 then reinserts the same SIM card into the UE. The carrier app 230 receives a SIM state loaded event from the framework 220 and enables the corresponding eSIM subscription. The carrier app 230 then makes the eSIM subscription the DDS.

Process 200d is an example sequence of steps for enabling DSDS after a SIM pop and swap (i.e., replacing a carrier-specific SIM card with a new carrier specific SIM card). The user 210 removes the carrier-specific SIM card from the UE. The carrier app 230 receives a SIM state absent event from the framework 220 and disables the eSIM subscription. The user 210 then inserts a new carrier-specific SIM card into the UE. The carrier app 230 receives a request to load the carrier configuration from the framework 220 and returns the brand-specific configuration in response to the request. The carrier app 230 then enables DSDS if an EUICC is present. The carrier app 230 queries the server 240 for the activation code of the service, and receives the activation code and ICCID in response to the query. The carrier app 230 then checks whether the eSIM profile is already present on the framework 220. The carrier app 230 then uses a switch function to enable the eSIM subscription, groups the eSIM subscription with the PSIM subscription, sets the eSIM subscription as opportunistic, and makes the eSIM subscription the DDS. The carrier app 230 then enables data roaming to route through the eSIM. The carrier app 230 persists the group ID and subscription IDs of the eSIM subscription and the PSIM subscription.

FIG. 3 is a flow diagram of an example process 300 for enabling a dual SIM configuration. For example, the process 300 can be used by the user device 102 in the environment 100. At block 310, it is determined that the mobile device supports a virtual SIM (eSIM) capable of communicating with radio access network (RAN) resources of a first wireless service provider regardless of whether the SIM card communicates with the RAN resources of the first wireless service provider or the RAN resources of a second wireless service provider different from the first wireless service provider. Determining that the mobile device supports an eSIM may include detecting whether the mobile device has an embedded Universal Integrated Circuit Card (EUICC).

At block 320, responsive to determining that the mobile device supports an eSIM, an eSIM profile for configuring the eSIM is obtained. The eSIM profile may be obtained by launching an application on the mobile device and initiating a communication between the application and an application programming interface (API) associated with the EUICC. The eSIM profile may be received from a remote server. An identifier associated with the mobile device may be transmitted by the mobile device to the remote server, and the eSIM profile may be received from the remote server in response to transmitting the identifier. The identifier associated with the SIM card may include an embedded identifier (EID) of the EUICC. The eSIM profile may then be stored on the EUICC via the API.

At block 330, the eSIM is configured in accordance with the eSIM profile such that data packets to and from the mobile device are routed through the eSIM over the RAN resources of the first wireless service provider. At block 340, data packets are routed to and from the mobile device through the eSIM over the RAN resources of the first wireless service provider at a time when the SIM card is configured to route voice calls over the RAN resources of a second wireless service provider. In some implementations, the process 300 can include additional steps or fewer steps, or some of the steps can be divided into multiple steps. For example, the routing of data packets through the eSIM may be disabled in response to determining a removal of the SIM card from the mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible, non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special-purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by special-purpose logic circuitry, and apparatus can also be implemented as, special-purpose logic circuitry, e.g., an FPGA (field programmable gate array) or an ASIC (application-specific integrated circuit).

Computers suitable for the execution of a computer program include, by way of example, general-purpose or special-purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smartphone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., an LCD (liquid crystal display), an OLED (organic light-emitting diode) display, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and a server are generally remote from each other and typically interact through a communication network. The relationship of a client and a server arises by virtue of computer programs running on the respective computers and having a client-server relationship to each other. In some embodiments, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 4:
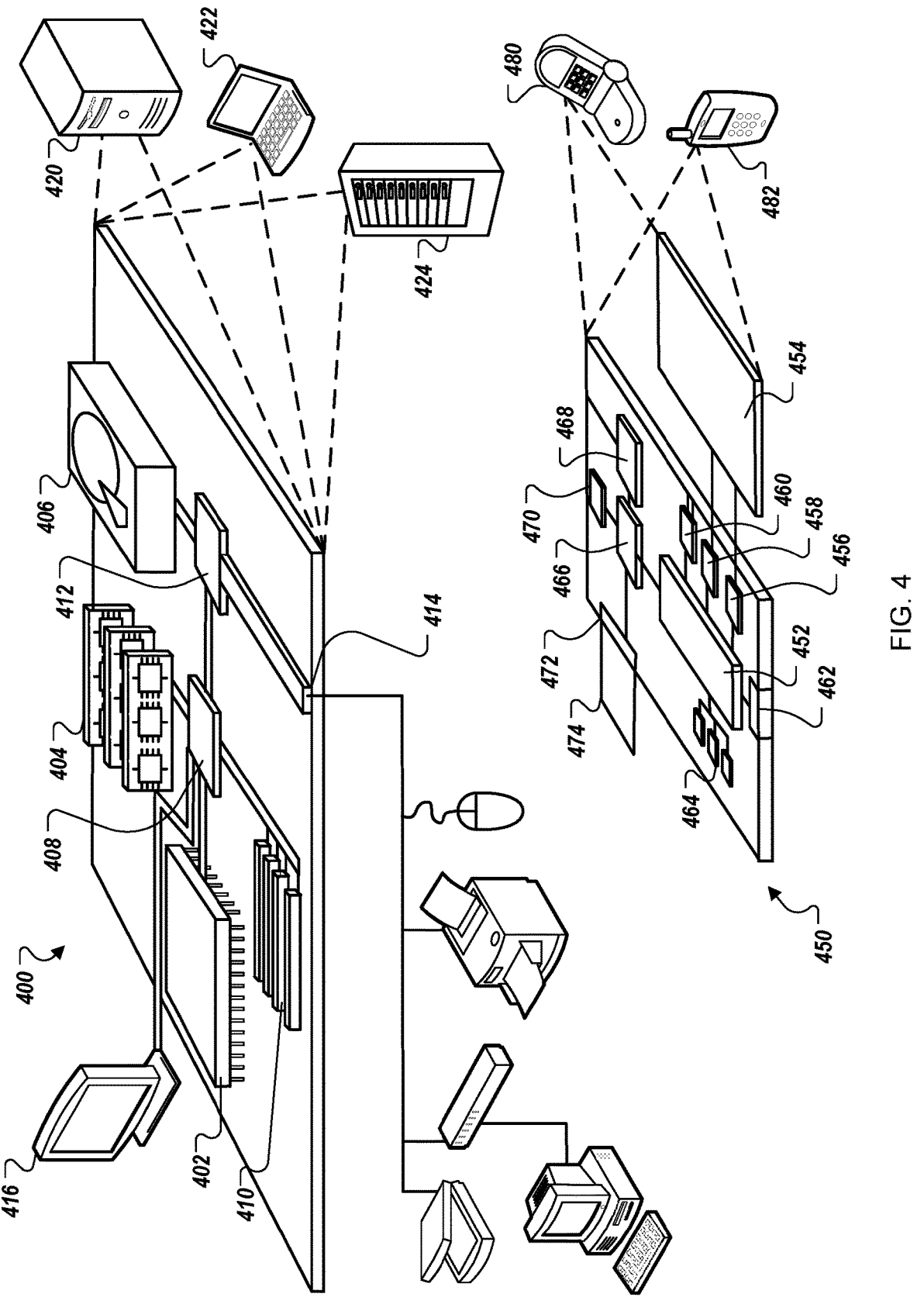
FIG. 4 is a block diagram of a computing system that can be used in connection with computer-implemented methods described in this specification.

FIG. 4 shows an example of a computing device 400 and a mobile computing device 450 (also referred to herein as a wireless device) that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 400 and/or the mobile computing device 450 can form at least a portion of the dual SIM configuration environment described above.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 406. Each of the processor 402, the memory 404, the storage device 406, the high-speed interface 408, the high-speed expansion ports 410, and the low-speed interface 412 are interconnected using various buses and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, flash memory, or other similar solid-state memory device, or an array of devices, including devices in a storage area network or other configurations. Instructions can be stored in an information carrier. The instructions, when executed by one or more processing devices, such as the processor 402, perform one or more methods, such as those described above. The instructions can also be stored by one or more storage devices, such as computer-readable or machine-readable media, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In some implementations, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in FIG. 4. For example, it may be implemented as a standard server 420, or as multiple standard servers in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each such devices may contain one or more of the computing device 400 and the mobile computing device 450, and an entire system may be made up of multiple computing devices communicating with each other.

The mobile computing device 450 includes a processor 452, a memory 464, an input/output device, such as a display 454, a communication interface 466, and a transceiver 468, among other components. The mobile computing device 450 may also be provided with a storage device, such as a micro-drive or other device, to provide additional storage. The processor 452, the memory 464, the display 454, the communication interface 466, and the transceiver 468, are interconnected using various buses, and several of the components may be mounted on a common motherboard or in other manners as appropriate. In some implementations, the mobile computing device 450 may include one or more camera devices (not shown).

The processor 452 can execute instructions within the mobile computing device 450, including instructions stored in the memory 464. The processor 452 may be implemented as a chipset of chips that include separate and multiple analog and digital processors. For example, the processor 452 may be a Complex Instruction Set Computers (CISC) processor, a Reduced Instruction Set Computer (RISC) processor, or a Minimal Instruction Set Computer (MISC) processor. The processor 452 may provide, for example, for coordination of the other components of the mobile computing device 450, such as control of user interfaces (UIs), applications running on the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near-area communication between the mobile computing device 450 and other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single In Line Memory Module (SIMM) card interface. The expansion memory 474 may provide extra storage space for the mobile computing device 450 and may also store applications or other information for the mobile computing device 450. Specifically, the expansion memory 474 may include instructions to carry out or supplement the processes described above and may also include secure information. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as the processor 452, perform one or more methods, such as those described above. The instructions can also be stored by one or more storage devices, such as one or more computer-readable or machine-readable mediums, such as the memory 464, the expansion memory 474, or memory on the processor 452. In some implementations, the instructions can be received in a propagated signal, such as over the transceiver 468 or the external interface 462.

The mobile computing device 450 may communicate wirelessly through the communication interface 466, which may include digital signal processing circuitry where necessary. The communication interface 466 may provide for Communications under various modes or protocols, such as Global System for Mobile communications (GSM) voice calls, Short Message Service (SMS), Enhanced Messaging Service (EMS), Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio Service (GPRS). Such communication may occur, for example, through the transceiver 468 using a radio frequency. In addition, short-range communication, such as using a Bluetooth or Wi-Fi, may occur. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert the spoken information to usable digital information. The audio codec 460 may likewise generate audible sound for a user, such as through a speaker, e.g., in a handset of the mobile computing device 450. Such sound may include sound from voice telephone calls, recorded sound (e.g., voice messages, music files, etc.), and sound generated by applications operating on the mobile computing device 450.

The mobile computing device 450 may be implemented in a number of different forms, as shown in FIG. 4. For example, it may be implemented in the mobile device described with respect to FIGS. 1-3. Other implementations may include a phone device 482 and a tablet device 484. The mobile computing device 450 may also be implemented as a component of a smartphone, personal digital assistant, AR device, or other similar mobile device.

The computing device 400 and/or the mobile computing device 450 can also include USB flash drives. The USB flash drives may store operating systems and other applications. The USB flash drives can include input/output components, such as a wireless transmitter or USB connector that may be inserted into a USB port of another computing device.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A method comprising:

obtaining, at a mobile device, a first network subscription corresponding to a first subscriber identity module (SIM);

determining, at the mobile device, that the mobile device supports the first network subscription and at least a second network subscription corresponding to at least a second SIM capable of communicating with radio access network (RAN) resources of a first wireless service provider regardless of whether the first network subscription corresponds to the first wireless service provider or a second wireless service provider different from the first wireless service provider;

responsive to determining that the mobile device supports the first network subscription and the at least second network subscription, obtaining the at least second network subscription for the at least second SIM;

binding the first network subscription and the at least second network subscription into a single functional unit by assigning a locally-generated group identifier to the first and second network subscriptions;

configuring the at least second network subscription to be omitted from a list of active subscriptions returned to a user interface of the mobile device such that a single service indicator is presented for the single functional unit;

associating the group identifier with the RAN resources to route data packets through the at least second SIM in accordance with the at least second network subscription; and routing data packets to and from the mobile device through the at least second SIM using the at least second network subscription at a time when the first SIM is configured to route voice calls using the first network subscription.

2. The method of claim 1, wherein determining that the mobile device supports the first network subscription and the at least second network subscription comprises detecting whether the mobile device comprises an embedded Universal Integrated Circuit Card (EUICC).

3. The method of claim 2, wherein routing data packets through the at least second SIM in accordance with the at least second network subscription comprises:

launching an application on the mobile device;

initiating a communication between the application and an application programming interface (API) associated with the EUICC;

receiving an eSIM profile from a remote server; and storing the eSIM profile on the EUICC via the API.

4. The method of claim 1, wherein routing data packets through the at least second SIM in accordance with the at least second network subscription comprises:

transmitting, by the mobile device to a remote server, an identifier associated with the mobile device; and receiving, in response to transmitting the identifier, an eSIM profile from the remote server.

5. The method of claim 4, wherein the identifier associated with the mobile device comprises an embedded identifier (EID) of an EUICC.

6. The method of claim 1, further comprising:

determining a removal of the first SIM from the mobile device; and in response, disabling routing of data packets through the at least second SIM.

7. A mobile device comprising:

one or more processors; and one or more non-transitory storage devices storing instructions that are operable, when executed by the one or more processors, to cause the one or more processors to perform operations comprising:

obtaining a first network subscription corresponding to a first subscriber identity module (SIM);

determining that the mobile device supports the first network subscription and at least a second network subscription corresponding to at least a second SIM capable of communicating with radio access network (RAN) resources of a first wireless service provider regardless of whether the first network subscription corresponds to the first wireless service provider or a second wireless service provider different from the first wireless service provider;

responsive to determining that the mobile device supports the first network subscription and the at least second network subscription, obtaining the at least second network subscription for the at least second SIM;

binding the first network subscription and the at least second network subscription into a single functional unit by assigning a locally-generated group identifier to the first and second network subscriptions;

configuring the at least second network subscription to be omitted from a list of active subscriptions returned to a user interface of the mobile device such that a single service indicator is presented for the single functional unit;

associating the group identifier with the RAN resources to route data packets through the at least second SIM in accordance with the at least second network subscription; and routing data packets to and from the mobile device through the at least second SIM using the at least second network subscription at a time when the first SIM is configured to route voice calls using the first network subscription.

8. The mobile device of claim 7, wherein the instructions that cause the one or more processors to determine that the mobile device supports the first network subscription and the at least second network subscription comprise instructions configured to detect whether the mobile device comprises an embedded Universal Integrated Circuit Card (EUICC).

9. The mobile device of claim 8, wherein the instructions that cause the one or more processors to route data packets through the at least second SIM in accordance with the at least second network subscription cause the one or more processors to perform operations comprising:

launching an application on the mobile device;

initiating a communication between the application and an application programming interface (API) associated with the EUICC;

receiving an eSIM profile from a remote server; and storing the eSIM profile on the EUICC via the API.

10. The mobile device of claim 7, wherein the instructions that cause the one or more processors to route data packets through the at least second SIM in accordance with the at least second network subscription comprise instructions configured to cause the one or more processors to perform operations comprising:

transmitting, to a remote server, an identifier associated with the mobile device; and receiving, in response to transmitting the identifier, an eSIM profile from the remote server.

11. The mobile device of claim 10, wherein the identifier associated with the mobile device comprises an embedded identifier (EID) of an EUICC.

12. The mobile device of claim 7, wherein the instructions cause the one or more processors to perform operations comprising:

determining a removal of the first SIM from the mobile device; and in response, disabling routing of data packets through the at least second SIM.

13. A non-transitory computer storage medium of a mobile device encoded with instructions that, when executed by one or more processors of the mobile device, cause the one or more processors of the mobile device to perform operations comprising:

obtaining a first network subscription corresponding to a first subscriber identity module (SIM);

determining that the mobile device supports the first network subscription and at least a second network subscription corresponding to at least a second SIM capable of communicating with radio access network (RAN) resources of a first wireless service provider regardless of whether the first network subscription corresponds to the first wireless service provider or a second wireless service provider different from the first wireless service provider;

responsive to determining that the mobile device supports the first network subscription and the at least second network subscription, obtaining the at least second network subscription for the at least second SIM;

binding the first network subscription and the at least second network subscription into a single functional unit by assigning a locally-generated group identifier to the first and second network subscriptions;

configuring the at least second network subscription to be omitted from a list of active subscriptions returned to a user interface of the mobile device such that a single service indicator is presented for the single functional unit;

associating the group identifier with the RAN resources to route data packets through the at least second SIM in accordance with the at least second network subscription; and routing data packets to and from the mobile device through the at least second SIM using the at least second network subscription at a time when the first SIM is configured to route voice calls using the first network subscription.

14. The non-transitory computer storage medium of claim 13, wherein determining that the mobile device supports the first network subscription and the at least second network subscription comprises detecting whether the mobile device comprises an embedded Universal Integrated Circuit Card (EUICC).

15. The non-transitory computer storage medium of claim 14, wherein the instructions that cause the one or more processors to route data packets through the at least second SIM in accordance with the at least second network subscription comprise instructions configured to cause the one or more processors to perform operations comprising:

launching an application on the mobile device;

initiating a communication between the application and an application programming interface (API) associated with the EUICC;

receiving an eSIM profile from a remote server; and storing the eSIM profile on the EUICC via the API.

16. The non-transitory computer storage medium of claim 13, wherein the instructions that cause the one or more processors to route data packets through the at least second SIM in accordance with the at least second network subscription comprise instructions configured to cause the one or more processors to perform operations comprising:

transmitting, by the mobile device to a remote server, an identifier associated with the mobile device; and receiving, in response to transmitting the identifier, an eSIM profile from the remote server.

17. The non-transitory computer storage medium of claim 16, wherein the identifier associated with the mobile device comprises an embedded identifier (EID) of an EUICC.

* * * * *